United States Patent Office 3,510,472
Patented May 5, 1970

3,510,472
METHOD OF PRODUCING CARDIOACTIVE GLYCOSIDES
Stanislaw Buchner, Birsfelden, near Basel, Switzerland, assignor to Solco Basel AG, Basel, Switzerland
No Drawing. Filed Sept. 25, 1967, Ser. No. 670,423
Claims priority, application Switzerland, Sept. 23, 1966, 13,729/66
Int. Cl. C07c *173/00*
U.S. Cl. 260—210.5      8 Claims

ABSTRACT OF THE DISCLOSURE

Leaves of *Adonis vernalis* L are extracted at 20–95° C. in an $N_2$ atmosphere with water or e.g. 5% aqueous ethanolic solution whereby glycosides are liberated from their naturally occurring complex compounds, by chemical reaction involving other ingredients present in the leaves. Cardioactive glycosides are recovered from the afore-obtained extract by further selective extraction with a chloroform-butanol or trichloroethylene-butanol mixture in mixture ratios ranging from 8:1 to 3:1 whereby active glycosidic agents having an L.D. in the cat of 0.1100±0.0040 mg./kg. are obtained, followed by chromatography with water-saturated butanol-toluene eluant.

---

The present invention relates to a method for producing cardioactive agents and compositions recovered from *Adonis vernalis* L as well as to cardioactive agents and compositions made according to the said method.

According to the present invention a cardioactive agent or composition is obtained by treating leaves of *Adonis vernalis* L either with water or a substantially aqueous, water-miscible solvent, e.g. an alcohol, extracting the resultant solution at least with one water-miscible organic solvent, such as alcohol or acetone, containing a relatively small quantity of water, concentrating, after each extraction operation, the resulting filtrates, treating the finally resultant, concentrated viscous to solid materials, which contain cardioactive glucosides, with water or an aqueous solvent, such as a strongly aqueous, alcoholic solution, then extracting the resultant aqueous solution in a sequence of several operation steps with a water-immiscible solvent, such as a mixture of chloroform and alcohol, in a ratio of 9:1, 8:1 and so on up to a ratio of 2:1, evaporating the extracts successively obtained by such extraction operations carried out at ratios ranging from 9:1 to 2:1, subjecting to chromatography all evaporated extracts resulting from the extraction steps carried out at ratios ranging from 8:1 to 3:1, for example on a carrier containing silicates, by using a water-saturated butanol-toluene mixture (ratio 1:1) and finally isolating from the eluates resulting from such chromatography procedure a highly cardioactive glucoside or glucoside mixture respectively showing an L.D. on cats of about 0.110±0.004 mg./kg.

According to a preferred embodiment, leaves of *Adonis vernalis* L are treated, preferably in a nitrogen atmosphere, at a temperature of not more than 100° C. and preferably at a temperature ranging from 20° C. to 95° C. with either water or an aqueous solvent, whereby some glycosides are liberated from their native state, i.e. from the naturally occurring complex compounds of such glycosides, due to chemical reactions with other ingredients present in *Adonis vernalis* L (e.g. flavones, etc.). The resultant solution is then preferably concentrated in vacuo and the residue is treated with alcohol, whereupon the substances which are soluble in alcohol are partially or completely freed from alcohol; then the remaining residue is treated with acetone and the substances soluble in acetone are partially or completely freed from acetone by using per se conventional methods. The resultant residue is dissolved in water and the aqueous solution thus obtained is treated in the way described above with a water-immiscible solvent using the mixing ratios already disclosed above.

As silicates, kieselguhr, Celite, sea sand and the like can be used.

The extraction steps are preferably carried out as follows: The aqueous solution is shaken out in a sequence of operation steps with the water-immiscible solvent mixture, e.g. chloroform or trichloroethylene and an alcohol, such as butanol. It is preferred to first extract with a mixture of chloroform and alcohol in a mixture ratio of 9:1 and then with a chloroform-alcohol mixture of 8:1, whereupon an extraction step in a mixture ratio of 3:1 and finally an extraction step with a chloroform-alcohol mixture of a ratio of 2:1 follow.

When working in the way disclosed in the preceding paragraph the following materials are produced:

(1) The extraction step (ratio 9:1) yields a mixture of Adonis glycosides partly unknown hitherto and containing about 30% of the cardioactive ingredients of the starting material;

(2) The extracts obtained with quantity ratios ranging from 8:1 to 3:1 and resulting from the chromatography step yield a series of fractions containing totally about 45% of the cardioactive ingredients of the starting material and comprising a definitely novel mixture of cardioactive substances. It has also been observed that the crystallized main substance of the various fractions resulting from chromatography of the chloroform-alcohol mixture, when using mixture ratios from 8:1 to 3:1, shows the following test data for cats, namely L.D.=0.1100±0.0040 mg./kg.;

(3) The extract resulting from a mixture ratio of 2:1 yields a mixture of new polar glycosides which contains about 25% of the cardioactive ingredients of the starting material.

Furthermore, it has been found that other mixture ratios, i.e. those which do not fall within the range of 9:1 to 2:1, yield other products, i.e. other mixtures of glycosides than those obtained according to the present invention.

While extraction methods of the above kind are known in practice for many other purposes, they have never been applied to *Adonis vernalis* L. Accordingly, it must be considered to be very surprising that it has become possible to produce—by chemical reactions—new glycosides from *Adonis vernalis* L. This fact is in full contradistinction to the report of Prof. R. Tschesche (Chem. Berichte 86, 574, 1953), according to which no other glycosides than cymarine and adonitoxine can be produced from *Adonis vernalis* L.

It is also known to recover from the fraction with a mixing ratio of 9:1 a mixture of cardioactive glycosides, only four of which have been chemically identified. According to the said known method the glycosides present in the said fraction have been isolated on an industrial scale from an aqueous alcoholic medium by adsorption methods using adsorbent charcoal. Since the said isolated glycosides have been adsorbed on the active charcoal according to the said known method it is almost impossible to separate the glycosides from the charcoal.

When working according to the present invention the fraction 9:1 yields a mixture of new glycosides hitherto unknown, the new method making possible the recovery of the said mixture of new glycosides in a simpler and more economical way than the known method. The said fraction 9:1 obtained according to the present invention shows the following test data: L.D. for pigeon=3.6 mg./kg.

The fractions ranging from 8:1 to 3:1 yield highly cardioactive products which constitute a mixture of new glycosides with a test value L.D. on pigeon: 2.27 mg./kg.

Finally, also the fraction 2:1 constitutes a mixture of new glycosides which also possesses a high cardioactivity and the following test data: L.D. on pigeon=2.29 mg./kg.

The invention will now be described by the following example, without being limited thereto.

EXAMPLE 10 kilograms of dried and powdered *Adonis vernalis* L leaves are heated with 100 kilograms of an aqueous solvent (e.g. a 5% ethanolic solution) at 10 to 95° C. in a nitrogen atmosphere for 15 to 90 minutes under stirring, and are then filtered. The obtained solution (filtrate) is concentrated in vacuo and is then exhaustively extracted with 96 to 99.6% ethanol. The alcohol extracts are concentrated and then exhaustively extracted with acetone. The acetone extract is evaporated, the residue is dissolved in water and the so-obtained aqueous solution is extracted first with a chloroform-alcohol mixture (mixing ratio 9:1), then with various chloroform-alcohol mixtures (mixing ratios 8:1 to 3:1) and finally with a chloroform-alcohol mixture having a mixing ratio of 2:1.

The extracts resulting from the chloroform-alcohol mixtures with ratios 8:1 to 3:1 are subjected to chromatography on a silicate column previously impregnated with water, while using a water-saturated butanol-toluene mixture.

When working in this way, a number of eluates are recovered. Each of the said eluates is analyzed by chromatography in a manner known per se in order to ascertain the presence of highly active glucoside or glucosides respectively showing an L.D. on cats of about 0.1100±0.004 mg./kg. Then those eluates which contain the said highly active glucoside or a mixture of highly active glucosides are combined together. The combined eluates are evaporated to dryness and the desired glucosides are allowed to crystallize from an alcohol-water mixture, e.g. a butanol-water mixture.

The main glucoside thus obtained shows the following color reactions:

Legal test—Red
Kedde test—Violet
84% $H_2SO_4$ test—After 1 minute dark green
After 2 minutes green
After 5 minutes dirty green
After 30 minutes greyish green
After 60 minutes light grey-yellowish-green
After 120 minutes light grey-almost colorless
Keller-Kiliani test—Negative
Xanthydrol test—Negative Since the $R_f$-values for chromatography with a butanol-toluene mixture (mixing ratio 1:1) saturated with water cannot be reproduced on paper impregnated with water, the approximative $R_1$-values compared with known substances are given in the following:

"Vernadigine"—$R_f$ about 0.7
Highly active glucoside—$R_f$ about 0.5
Strophanthidine-$\beta$-d-glucopyranoside—$R_f$ about 0.3

The novel mixture resulting from the use of extraction ratios from 8:1 to 3:1 is a cardioactive agent which is useful inter alia for the same purposes as e.g. the prior known "Vernadigine." The said cardioactive agent can be administered perorally or by injection in per se conventional manner, the injection agent being in the form of an aqueous solution which may be stabilized e.g. with a glycol. Doses range from about 0.25 to 0.5 mg. or twice daily in mammals suffering for example congestive heart failure.

What is claimed is:

1. A method for producing a cardioactive agent comprising treating leaves of *Adonis vernalis* L either with water or a substantially aqueous, water-miscible solvent, extracting the resultant solution at least with one water-miscible organic solvent, containing a relatively small quantity of water, concentrating, after each extraction operation, the resulting filtrates, treating the finally resultant, concentrated viscous to solid materials, which contain cardioactive glucosides, with water or an aqueous solvent, then extracting the resultant, aqueous solution in a sequence of several operation steps with a water-immiscible solvent, in the form of a mixture of chloroform and alcohol, in a ratio of 9:1, 8:1 and so on up to a ratio of 2:1, subjecting to chromatography all extracts resulting from the extraction steps carried out at ratios ranging from 8:1 to 3:1, with a water-saturated butanol-toluene mixture (ratio 1:1) as eluant, and finally isolating from the eluates resulting from such chromatography procedure a highly cardioactive glucosidic agent.

2. A method according to claim 1 wherein the initial treatment of the *Adonis vernalis* L leaves is effected in a nitrogen atmosphere.

3. A method according to claim 2 wherein said initial treatment is carried out at a temperature of at most 100° C.

4. A method according to claim 2 wherein said initial treatment is carried out at a temperature ranging from 20° C. to 95° C.

5. In a method for the preparation of a cardioactive agent by subjecting leaves of *Adonis vernalis* L to extraction with water or a water-miscible solvent and recovering cardioactive material from the aqueous extract, the improvement according to which aqueous extract from the said leaves is subjected to further extraction in a sequence of several operational steps with a mixture of chloroform and alcohol in a ratio of 9:1, 8:1, 7:1, 6:1, 5:1, 4:1 and 3:1, the several resultant extracts are subjected to chromatography with water-saturated butanol-toluene mixture, and finally a highly cardioactive glucosidic agent is isolated from the obtained eluates.

6. Cardioactive agent obtained according to claim 5.

7. A method for the production of cardioactive agents from *Adonis vernalis* L leaves which comprises extracting the said leaves at a temperature of about 20° to about 95° C. in an $N_2$ atmosphere with water or on about 5% ethanolic water solution, whereby glycosides are chemically liberated from naturally occurring complex compounds thereof, and selectively recovering from said liberated glycosides those which are cardioactive.

8. Cardioactive agent obtained according to claim 7.

References Cited

Tschesche et al. Chem. Ber. vol. 86, 1953, pp. 574–581.
Olszewski et al. Chem. Abst. vol. 65, p. 5301 (h).
Bogs et al. Chem. Abst. vol. 65, p. 19,925 (d).

LEWIS GOTTS, Primary Examiner

J. R. BROWN, Assistant Examiner

U.S. Cl. X.R.
424—182